81-201 SR
4819 XR RE 16,748
[redacted]
Draftsman

Sept. 27, 1927.

C. M. BOUDETTE

SOUND REPRODUCING APPARATUS

Re. 16,748

Original Filed July 21, 1922

Inventor.
Clayton M. Boudette,
by his attorney
Farnum G. Ogden

Draftsman

19

Reissued Sept. 27, 1927. Re. 16,748

UNITED STATES PATENT OFFICE.

CLAYTON M. BOUDETTE, OF REVERE, MASSACHUSETTS.

SOUND-REPRODUCING APPARATUS.

Original No. 1,557,554, dated October 20, 1925, Serial No. 576,539 filed July 21, 1922. Application for reissue filed June 28, 1927. Serial No. 202,152.

This invention relates to sound reproducing apparatus and is especially concerned with the problems presented in the volume reproduction of sounds transmitted by radio telephony.

In radio work it is now a common practice to use so-called "loud speakers" in reproducing music, speeches and the like. While these pieces of apparatus give very satisfactory reproductions under some conditions, they produce very distorted results at other times and they give only very faint and scarcely audible reproductions under many circumstances.

It is the chief object of the present invention to devise a loud speaking apparatus which will reproduce music, speech, or other sounds truthfully, preserving the original quality and tone. While the invention is especially concerned with loud speaking apparatus designed for use in radio telephony, it can also be used to advantage in other sound reproducing apparatus.

The invention especially involves improvements in the electro-magnetic mechanism of loud speakers and it utilizes the weak fluctuating "voice currents" that must be dealt with in wireless receiving apparatus, or in the amplifiers used with them, in a manner which enables these currents to produce finer gradations in the vibrations of the receiving diaphragm and to cause this diaphragm to respond more accurately to the fluctuations in said currents than do the forms of apparatus in use at the present time.

The nature of the invention will be readily understood from the following description when read in connection with the accompanying drawings illustrating the preferred form of the invention, and the novel features will be particularly pointed out in the appended claims.

Figure 1:
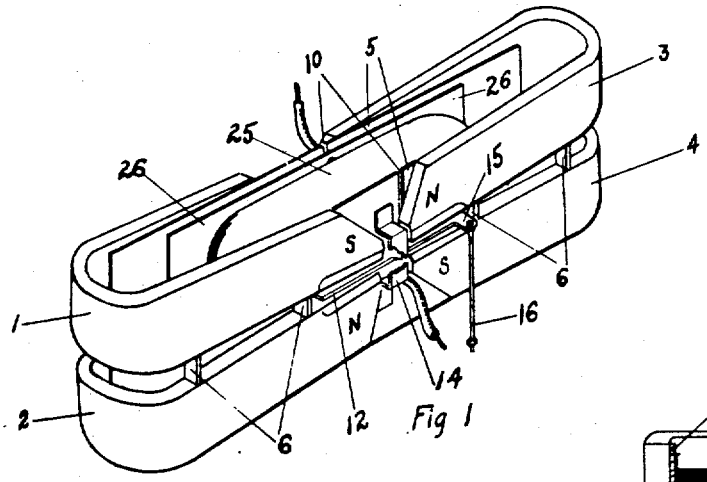
Figure 1 is a perspective view of an electromagnetic apparatus for vibrating a diaphragm.
Figure 3:
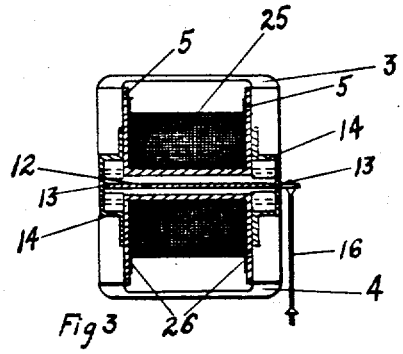
Fig. 3 is a vertical cross sectional view of the apparatus shown in Fig. 1, the plane of cross section lying in the axis about which the armature oscillates.

The embodiment of the invention illustrated in the drawings comprises four permanent magnets of the horse-shoe type designated, respectively, at 1, 2, 3 and 4, the magnets 1 and 3 being arranged above the respective magnets 2 and 4, and the poles of all four magnets being located closely adjacent to each other. The magnets are supported in this relationship by metal strips 5—5, preferably of copper, brass, or other suitable non-magnetic material secured to the inside faces of the magnets and provided with out-turned tongues or lugs 6—6 which project between the adjacent faces of the superposed magnets and hold them in properly spaced relationship. Screws 7—7 threaded into a base plate 9 and having collars 8—8 that bear on the upper edges of the uppermost magnets 1 and 3, serve to clamp all four magnets securely on said base plate, this plate also being made of brass or other suitable non-magnetic material. The plates 5—5 are slotted, as shown at 10—10, to break up their continuity and to prevent eddy currents from circulating in them.

Figure 2:
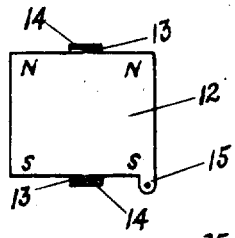
Fig. 2 is a cross-sectional plan view of the armature of the apparatus shown in Fig. 1, showing the mounting of this armature.

Mounted between the poles of the permanent magnets is an armature 12 preferably consisting of a relatively thin flat plate of silicon steel or other suitable material, this armature being pivoted at its ends, as shown at 13—13, Fig. 2, in metal yoke pieces 14—14 secured to the plates 5—5. This armature has a length approximately equal to the width of the horse-shoe magnets, and it is provided at one corner with a lug 15 which projects beyond the lateral faces of the magnets 3 and 4, and is connected by means of a rod 16 with the central portion of a resilient diaphragm 17. The marginal portion of this diaphragm is clamped with even marginal pressure, as usual, between two rubber rings 18—18 located in an annular recess formed in the lower part of the base plate 9, the rings being held in this recess by a plate 19 secured to the base 9 by screws 20—20. The diaphragm preferably is made of mica, and the supporting means just described leaves the circular central area of this diaphragm free to vibrate, as usual in apparatus of this type. The rod 16 is not connected exactly to the geometrical center of the diaphragm, but this connection is slightly decentered, the geometrical center of the diaphragm being indicated in Fig. 4, at 22. This highly important and novel mode of securing the armature rod to the diaphragm is not claimed herein since it forms the subject-matter of a divisional application Ser. No. 655,779, filed Aug. 4, 1923. The plate 19 is provided with a hollow nipple 23 located opposite the central portion of the diaphragm 17, to which nipple a horn or equivalent device may be connected.

The mounting of the armature 12 as above described enables it to oscillate about the axis of the pivots 13—13, but its connection with the resilient diaphragm 17 holds it normally in a neutral or central position. For the purpose of oscillating this armature about its axis, it is encircled by a coil 25, the plane of the windings of this coil lying at right angles to the axis 13—13 of the armature. A suitable shell of insulating materials, parts of which are shown at 26, supports the coil in a stationary position between the permanent magnets.

The coil 25 is connected in the circuit in which the fluctuating voice currents are induced, and consequently when such currents flow through it, it produces a correspondingly fluctuating magnetic flux in the armature 12, the magnetic lines of force flowing longitudinally through the armature from one end thereof to the other, parallel to the axis 13—13. This results in producing north and south poles in said armature at opposite ends thereof. Due to the fact tha the armature is flat and relatively wide, north and south poles are formed at both sides of the axis of the armature.

Figure 4:
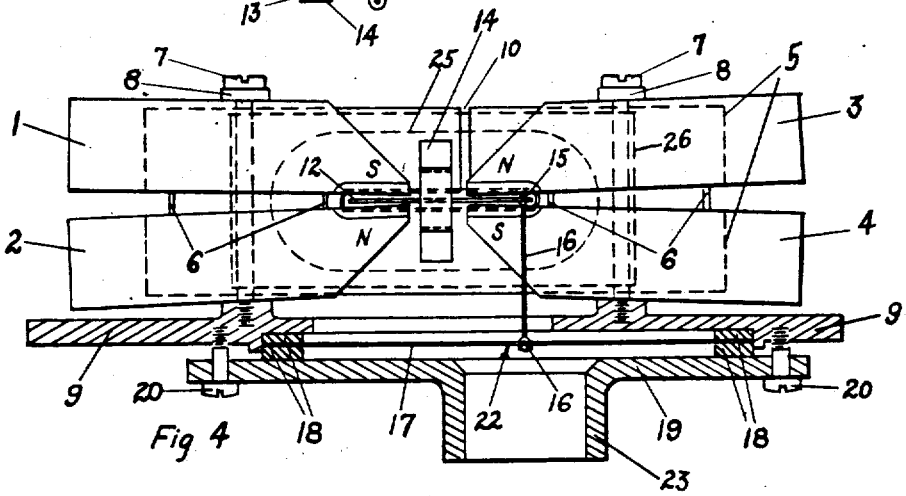
Fig. 4 is a view, partly in side elevation and partly in vertical cross section, showing the apparatus illustrated in Fig. 1 connected with a diaphragm.

Referring to Figs. 1 and 4, it will be seen that the north poles of the permanent magnets 2 and 3, (indicated by the letters N—N) and arranged in diametrically opposed relationship to each other, while the south poles of the magnetic 1 and 4 (indicated by the letters S—S) are arranged in a similar relationship. Obviously, the same pole arrangement exists at the opposite side of the apparatus, the only difference being that the poles are reversed. So long as no current flows in the coil 25, the poles of the permanent magnets will exert a substantially balanced action on the armature 12. As soon, however, as a current flows through the coil 25, this condition will immediately be disturbed. Assuming, for the moment, that the direction of flow of current in the coil 25 is such as to create a north pole at the upper end of the armature 12, Fig. 2, and a south pole at the opposite end, it will be evident that in Fig. 4 the south pole is at the end toward the observer. The left-hand side of the armature will be repelled by the south pole of the magnet 1 and attracted by the north pole of the magnet 2, while the right-hand side of this end of the armature will be attracted to the north pole of the maggnet 3 and repelled by the south pole of the magnet 4. The magnetic forces will operate in a similar manner on the north pole of the armature at its opposite end, and these forces thus will act, when this condition obtains, to tip the armature 12 in a counter-clockwise direction, Fig. 4, about its axis 13—13. The force of this tipping movement will vary with the intensity of the current flowing through the coil 25. When the current dies down the resilient diaphragm 17 will return the armature again to its neutral position. If the current reverses in the coil 25, the armature 12 will be tipped in a clockwise direction, Fig. 4.

It will not be appreciated that with this arrangement very feeble currents flowing through the coil 25 will produce relatively powerful oscillations of the armature 12. These oscillations will be positively transmitted to the diaphragm 17 through the rod 16, thus producing in the diaphragm vibrations varying with the fluctuations of the current in the coil 25.

It will be observed that the faces of the magnets are cut away in a manner which tends to concentrate the magnetic lines of force in the neighborhood of the armature. It should also be noted that the outer ends of the magnets 1 and 2, and the corresponding ends of the magnets 3 and 4 are tipped somewhat away from each other, so that a greater clearance is provided between the poles of the magnets and the outer edges of the armature than between the inner ends of the poles and the parts of the armature adjacent to its axis. This arrangement permits the apparatus to work with very low clearances between the armature and the tips of the pole faces while still enabling the armature to have a very substantial range of oscillation. The clearance between the tips of the pole faces and the armature may vary in accordance with the amount of input current which will determine the clearance, or air gap, required at the outer edges of the armature. For manufacturing purposes it is found to be generally satisfactory to provide an air gap of fifteen-thousandths of an inch at the outer edges of the armature, this gap being sufficient to permit as great a degree of oscillation as is ordinarily employed in the use of the apparatus. The preferred construction of the apparatus provides a ratio of the width of air gap at the outer edge of the armature and at the tips of the magnets of five to one, so that with fifteen-thousandths at the armature outer edge the gap can readily be reduced to as low as three-thousandths at the tips of the poles. As illustrated, the relative angular position of the magnets is determined and maintained by properly proportioning the height of the various spacing lugs 6, but it is within the scope of the invention to substitute for these lugs a mounting that will permit a relative adjustment vertically of the magnets in a manner more rapidly to accommodate the apparatus to variations in the amount of input current than is possible by changing the length of the lugs 6.

It will be observed that the clearance gradually increases as the pole pieces recede, at either side, from the axis of oscillation of the armature until the maximum air gap, required at the armature outer edges for the amount of input current used, is obtained. This arrangement has the important practical advantage of materially increasing the sensitiveness of the instrument, because, by virtue of the decreased air gap at the tips of the poles, the weaker fluctuating current will create a greater displacement of the armature that will, in turn, be transmitted to the diaphragm. The smaller air gap at the pole tips reduces the resistance to the passage of magnetic lines of force so that the weaker fluctuations in current produce greater variations in magnetic flux thus drawing the armature further out of balance. As a result the armature vibrations follow more accurately the variations in current intensity and the sensitivity is increased to such a marked degree that all tone modulations are made distinct and even overtones, as from a piano, are brought out and heard with the original tones that produce them.

It will be understood from the foregoing that the advantages obtained are not dependent upon the use of permanent magnets, but that the use of electro-magnets for oscillating the armature, and thus vibrating the diaphragm, is within the scope of the invention.

I have found in actual practice that this apparatus reproduces music, speech, and the like, transmitted by radio clearly and faithfully and is far superior to prior forms of apparatus of this character of which I have been able to learn. The difference is particularly marked where a volume reproduction of the transmitted sounds is made.

It will be clear to those skilled in the art to which this class of apparatus pertains, and with the general objects of the present invention in view, that changes may be made in the details of structure, the described and illustrated embodiment thereof being intended as an exploitation of its underlying essentials, the features whereof are definitely stated in their true scope in the claims herewith.

Having thus described my invention, what I desire to claim as new, is:—

1. In a sound reproducing apparatus, the combination of an armature, means supporting said armature for oscillating movement about an axis, a coil encircling said armature and operative when a current flows therethrough to create north and south magnetic poles in said armature with said poles adjacent, respectively, to the opposite ends of said axis, means for creating magnetic lines of force cooperating with said magnetic poles to oscillate said armature on its axis, and a resilient diaphragm connected with said armature to be vibrated thereby.

2. In a sound reproducing apparatus, the combination of an armature, means supporting said armature for oscillating movement about an axis, a coil encircling said armature and operative when a current flows therethrough to create north and south magnetic poles in said armature with said poles adjacent, respectively, to the opposite ends of said axis, means for creating magnetic fields cooperating with said magnetic poles to exert both magnetic attraction and repulsion on said armature at each side of said axis, and thereby to oscillate said armature as the field in said armature fluctuates, and a resilient diaphragm connected with said armature to be vibrated thereby.

3. In a sound reproducing apparatus, the combination of an armature, means supporting said armature for oscillating movement about an axis, a coil encircling said armature and operative when a current flows therethrough to create north and south magnetic poles in said armature with said poles adjacent, respectively, to the opposite ends of said axis, means for creating magnetic fields cooperating with said magnetic poles to oscillate said armature about said axis when a fluctuating current flows through said coil, and a resilient diaphragm connected with said armature to be vibrated thereby.

4. In a sound reproducing apparatus, the combination of an armature, means supporting said armature for oscillating movement about an axis, a coil encircling said armature and operative when a current flows therethrough to create north and south magnetic poles in said armature with said poles adjacent, respectively, to the opposite ends of said axis, means operative to create magnetic fields exerting attraction and repulsion on said armature at each side of the axis thereof at each of said poles and thereby to oscillate said armature about its axis as the current in said coil fluctuates, and a resilient diaphragm connected with said armature to be vibrated thereby.

5. In a sound reproducing apparatus, the combination of a relatively flat armature, means supporting said armature for oscillating movement about an axis, a coil operatively associated with said armature and operative, when a fluctuating current flows therethrough, to create a fluctuating magnet field in said armature with the magnetic flux running through the armature substantially parallel to said axis, whereby north and south magnetic poles are created in said armature at opposite ends thereof, a plurality of magnets cooperating with the poles of said armature to exert both magnetic repulsion and attraction on said armature at each side of said axis, and a resilient diaphragm connected with said armature to be vibrated thereby.

6. In a sound reproducing apparatus, the combination of a relatively flat armature, means supporting said armature for oscillating movement about an axis, a coil operatively associated with said armature and operative, when a fluctuating current flows therethrough, to create a fluctuating magnet field in said armature with the magnetic flux running through the armature substantially parallel to said axis, whereby north and south magnetic poles are created in said armature at both sides of said axis, and four permanent horseshoe magnets arranged two on each side of said axis, the poles of each magnet being positioned closely adjacent to opposite sides of said armature and the north and south poles of the opposite magnets being diametrically opposed to each other, and a resilient diaphragm connected with said armature at one side of its axis, whereby the movements of said armature are transmitted to said diaphragm.

7. In a sound reproducing apparatus, the combination of a relatively flat armature, means supporting said armature for oscillating movement about an axis, a coil operatively associated with said armature and operative, when a fluctuating current flows therethrough, to create a fluctuating magnet field in said armature with the magnetic flux running through the armature substantially parallel to said axis, whereby north and south magnetic poles are created in said armature at both sides of said axis, four permanent horseshoe magnets arranged two on each side of said axis, the poles of each magnet being positioned closely adjacent to opposite sides of said armature and holding the armature in substantially a magnetically balanced condition so long as no current is flowing in said coil, a resilient diaphragm, and a positive connection between said diaphragm and said armature whereby the movements of said armature are transmitted to said diaphragm, the faces of said permanent magnets adjacent to said armature being positioned to afford greater clearance with the outer edges of said armature than with the portions thereof adjacent to its axis.

8. In a sound reproducing apparatus, the combination of an armature, means supporting said armature for oscillating movement about an axis, a coil associated with said armature and operative when a current flows therethrough to polarize said armature, a plurality of magnets at each side of said axis cooperating with the poles of said armature to exert both magnetic repulsion and attraction on the armature at each side of said axis, and a resilient diaphragm connected to said armature to be vibrated thereby.

9. In a sound reproducing apparatus, the combination of a relatively flat armature; means supporting said armature for oscillating movement about an axis; a coil associated with said armature and operative, when a fluctuating current flows therethrough, to create a fluctuating magnetic field in said armature; a magnet having pole faces overlapping said armature with the tips of the poles adjacent to said axis, said faces being inclined with reference to said armature and having a minimum clearance with the armature adjacent to said axis and a gradually increasing clearance as they extend away from said axis; and a resilient diaphragm connected with said armature to be vibrated thereby.

10. In a sound reproducing apparatus, the combination of a relatively flat armature; means supporting said armature for oscillating movement about an axis; a coil encircling said armature and operative, when a fluctuating current flows therethrough, to create a fluctuating magnetic field in said armature; means including pole pieces located closely adjacent to the opposite faces of said armature for creating magetic fields cooperating with said fluctuating field to exert both magnetic attraction and repulsion on said armature, the faces of said pole pieces diverging relatively to said armature as they extend away from said axis, whereby a minimum clearance is provided between them and the armature adjacent to said axis and said clearance increases as the distance from said axis increases; and a resilient diaphragm connected with said armature to be vibrated thereby.

11. In a sound reproducing apparatus, the combination of an armature, means supporting said armature for oscillating movement about an axis, a coil encircling said armature and operative when a current flows therethrough to create north and south magnetic poles in said armature with said poles adjacent, respectively, to the opposite ends of said axis, and means for creating magnetic lines of force cooperating with said magnetic poles to oscillate said armature on its axis.

12. In a sound reproducing apparatus, the combination of an armature, means supporting said armature for oscillating movement about an axis, a coil encircling said armature and operative when a current flows therethrough to create north and south magnetic poles in said armature with said poles adjacent, respectively, to the opposite ends of said axis, and means for creating magnetic fields cooperating with said magnetic poles to exert both magnetic attraction and repulsion on said armature at each side of said axis.

13. In a sound reproducing apparatus, the combination of an armature, means supporting said armature for oscillating movement about an axis, a coil encircling said armature and operative when a current flows therethrough to create north and south magnetic poles in said armature with said poles adjacent, respectively, to the opposite ends of said axis, and means operative to create magnetic fields exerting attraction and repulsion on said armature at each side of the axis thereof at each of said poles.

14. In a sound reproducing apparatus, the combination of a relatively flat armature; means supporting said armature for oscillating movement about an axis; a coil encircling said armature and operative, when a fluctuating current flows therethrough, to create a fluctuating magnetic field in said armature; and means including pole pieces located closely adjacent to the opposite faces of said armature for creating magnetic fields exerting both magnetic attraction and repulsion on said armature, the faces of said pole pieces adjacent to said armature being positioned to afford greater clearance with the surfaces of said armature remote from its axis than with surfaces thereof closer to its axis.

In testimony whereof I have hereunto signed this specification.

CLAYTON M. POUDETTE.